United States Patent Office 3,073,806
Patented Jan. 15, 1963

3,073,806
CROSS-LINKED OLEFIN-MALEIC ANHYDRIDE
INTERPOLYMERS
Raymond H. Reinhard, Galveston, Tex., assignor to Monsanto Chemical Company, St. Louis, Mo., a corporation of Delaware
No Drawing. Filed Nov. 23, 1959, Ser. No. 854,539
8 Claims. (Cl. 260—78.5)

The present invention relates to cross-linked interpolymers of $C_2$ to $C_4$ olefins and salts thereof. More particularly, it relates to interpolymers of ethylene, propylene, and butylenes with maleic anhydride cross-linked with diallyloxy hydrocarbons and alkali metal and ammonium salts thereof.

It is known that carboxyl-containing polymers having certain desirable properties can be prepared by polymerizing a carboxylic monomer with an olefinic compound in the presence of a cross-linking agent. Many cross-linking agents have been proposed and these are variously useful depending upon the particular polymerization system involved. It has now been discovered that diallyloxy hydrocarbons are especially effective as cross-linking agents for producing interpolymers of $C_2$–$C_4$ olefins and maleic anhydride. Such polymers or salts thereof find extensive use when dispersed in water as viscosity control agents. They act as bodying or thickening agents in the preparation of textile printing pastes, surgical jellies, creams and the like as well as stabilizers against crystal growth in liquid detergent compositions.

Broadly, the invention comprises reacting $C_2$–$C_4$ olefins with 1,2-dicarboxylic acids or their anhydrides in the presence of a diallyloxy hydrocarbon such as 1,4-diallyloxybutene-2 or 1,10-diallyloxydecane, for example, as a cross-linking agent. The dicarboxylic acids can be maleic acid, fumaric acid, the mono- or dichlorosubstituted maleic and fumaric acids, alkylated maleic and fumaric acids, mono- and diphenyl maleic acids, benzyl maleic acid, dibenzyl maleic acid, ethyl maleic acid or any similar acids containing a double bond in the chain between the carboxyl groups such as mesaconic and citraconic acids. Acids where the double bond has shifted from the 1,2-position such as itaconic and glutaconic acids can also be used. Preferably, however, the anhydride of each of the above-mentioned acids capable of anhydride formation is employed rather than the acids.

More specifically, the interpolymers of the invention are formed by polymerizing a monomeric mixture of maleic anhydride and a $C_2$–$C_4$ olefin, i.e., ethylene, propylene, n-butylene or isobutylene, or olefin mixture using as a cross-linking agent a compound of the formula

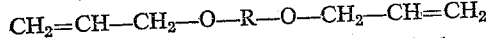

$$CH_2=CH-CH_2-O-R-O-CH_2-CH=CH_2$$

wherein R is a straight-chain aliphatic hydrocarbon radical of from 4 to 12 carbon atoms selected from the group consisting of alkylene radicals and unsaturated radicals of the formula $C_nH_{2n-2}$. Examples of such compounds include 1,4-diallyloxybutane, 1,5-diallyloxypentane, 1,6-diallyloxyhexane, 1,7-diallyloxyheptane, 1,8-diallyloxyoctane, 1,12-diallyloxydodecane, 1,5-diallyloxypentene-2, 1,6-diallyloxyhexene-3, 1,6-diallyloxyhexene-2, 1,7-diallyloxyheptene-2, 1,7-diallyloxyheptene-3, 1,8-diallyloxyoctene-2, 1,8-diallyloxyoctene-3, 1,10-diallyloxydecene-2, 1,12-diallyloxydodecene-3 and the like.

The amount of the cross-linking agent employed depends to some extent upon the olefin employed and the degree of cross-linking desired in the polymer. Generally, an amount in the range between 0.1 and 5.0% by weight of the total polymerizable mixture is employed.

The polymerization is carried out in an inert organic solvent, preferably a non-polymerizing hydrocarbon solvent, having solvating action on both the monomers and the cross-linking agent but which has little appreciable solvent or swelling action on the cross-linked heteropolymer produced. In this way, the polymer is obtained in the form of a fine powder which only requires freeing from solvent before use. Suitable solvents include, for example, ethylene dichloride, ethyl acetate, dioxane and, particularly, aromatic hydrocarbons such as benzene, toluene and xylene.

The olefin and anhydride are ordinarily charged in the equimolar proportions in which they react although variations can be made in the actual proportions used. The monomers and cross-linking agent are preferably dissolved in an amount of solvent such that the solids content of the reaction slurry formed is about 18%. This ordinarily represents an amount of solvent about six times the total weight of the compounds to be polymerized. The amount of solvent is not critical, however, and proportions of solvent as much as 10 or 20 times the weight of the olefin and maleic anhydride may be used. Alternatively, the diallyloxy hydrocarbon cross-linking agent may be added to the mixture of anhydride and olefin during the course of the polymerization either over part or all of the polymerization period. The resulting solution is mixed thoroughly and heated sufficiently so that the polymerization reaction takes place.

An organic solvent-soluble catalyst is necessary. Any of the organic free-radical catalysts is satisfactory. Among these are various organic solvent-soluble peroxygen compounds including benzoyl peroxide, caprylyl peroxide, acetyl peroxide, acetyl benzoyl peroxide, di-tert-butyl peroxide and others, azoisobutyronitrile, dimethyl azoisobutyrate, and many others. Mixtures of such catalysts are also suitable in the polymerization process of the invention. Radiation polymerization can be used too, e.g., such high-energy radiation sources as X-rays, γ-rays, neutrons and the like can be used to initiate polymerization.

The polymerization can be carried out at a temperature within the range from 0° C. to 100° C. with optimum temperatures varying with the particular $C_2$–$C_4$ olefin employed. Preferred temperatures lie for the most part in the range from 40° C. to 80° C. Pressure may vary from atmospheric to about 600 p.s.i.g. or higher depending upon the particular olefin used.

A less preferred method of forming the new cross-linked olefin-maleic anhydride interpolymers is to add the cross-linking diallyloxy hydrocarbon to the copolymer and carry out the cross-linking as a separate chemical reaction or polymerization step.

At the completion of the polymerization reaction, the heteropolymer is recovered from the organic solvent by any suitable means. While the interpolymers may be used in the anhydride form, they are more commonly employed as viscosity control agents in the form of their alkali metal or ammonium salts which form dilute swollen gels or dispersions in aqueous medium. This conversion is generally effected by solution in the appropriate aqueous hydroxide. Alkali metal or ammonium salts of the interpolymers such as sodium, potassium, lithium, rubidium and caesium salts may be obtained by reacting the interpolymers with the stoichiometric amount of the corresponding hydroxide. Partial salts may, of course, be produced by using less than the quantity of alkali required to effect complete conversion of the carboxyl groups. When polymeric anhydrides are dissolved using ammonia, an appreciable amount of amide groups are formed resulting in mixed ammonium-amide polymeric salts.

The following examples are presented to illustrate the invention but are not to be construed as limiting it in any manner whatsoever. All parts given are by weight.

Example 1

The 1,4-diallyloxybutene-2 for use as a cross-linking agent in the polymerization of ethylene and maleic anhydride was prepared as follows:

To 127 g. of allyl alcohol contained in a 500-ml., round-bottomed flask equipped with a stirrer was added 16.2 g. of lump sodium in small pieces. The mixture was heated with stirring until all the sodium went into solution, the reaction being conducted under an atmosphere of argon. The resulting sodium allylate was reacted with 1,4-dichlorobutene-2 by adding 44 g. of the latter dropwise to the allylate and heating the resulting mixture under reflux conditions for about two hours. The reaction mixture was washed several times with water to remove the salt and then subjected to distillation to recover the product 1,4-diallyloxybutene-2 (boiling at 108° C.–121° C. at 32 mm.; R.I. 1.4550 at 30.5° C.).

A one-gallon autoclave fitted with a paddle stirrer and pressure control means served as the polymerization reactor. After it has been completely dried and freed of air, a mixture of 181.5 parts of maleic anhydride dissolved in 2100 parts of benzene were charged to the reactor and heated to a temperature of about 70° C. To this solution were added 5.73 parts of benzoyl peroxide and 2.36 parts of 1,4-diallyloxybutene-2. The reactor was then charged with sufficient ethylene to give a pressure at the reaction temperature (70° C.) of approximately 600 p.s.i.g. The contents of the reactor were continuously agitated during the addition of the ethylene and throughout the entire reaction period. Additional ethylene was charged periodically to maintain the pressure at 600 p.s.i.g. The reaction was continued until the samples withdrawn at intervals and titrated with sodium hydroxide indicated that 98+% of the anhydride had been reacted (7 hr.). Unreacted ethylene was vented from the reactor, the reaction mixture was cooled and filtered, and the separated interpolymer was washed and dried.

A sample of the polymer was added to sufficient water containing ammonium hydroxide to make up a 1% concentration of the polymer in water, sufficient ammonium hydroxide having been added to neutralize the interpolymer and to form substantially the diammonium salt of the polymer. The viscosity of the resulting gel was determined with a Brookfield viscosimeter using a number 4 spindle at 6 r.p.m. and found to be 4500 centipoises at room temperature (about 25° C.).

Example 2

The experiment of Example 1 was repeated except that twice as much of the 1,4-diallyloxybutene-2 cross-linking agent was employed.

In a manner similar to that described in Example 1, a 1% solution of the ammonium salt of the interpolymer in water was prepared and its viscosity determined with a Brookfield viscosimeter was found to be 20,000 centipoises.

Example 3

Again the polymerization run of Example 1 was repeated in a substantially identical manner except that 9.75 g. of four times as much of the cross-linking agent, 1,4-diallyloxybutene-2, was employed in the polymerization recipe. The viscosity of a 1% aqueous dispersion of the ammonium salt of the interpolymer produced was 78,000 centipoises as determined with a Brookfield viscosimeter at room temperature (about 25° C.) using the No. 4 spindle at 6 r.p.m.

Example 4

A sample of 1,10-diallyloxydecane identified by its infrared spectrum was prepared according to the general method outlined in Example 1 by the reaction of sodium allylate with 1,10-dichlorodecane. This diallyl ether of decanediol was then employed as a cross-linking agent by substituting about 2.0% of it for 1,4-diallyloxybutene-2 in the polymerization recipe of Example 1 and the resulting mixture was polymerized in the same manner and under the same conditions as the original mixture to obtain an interpolymer of ethylene and maleic anhydride. A 1% aqueous solution of the ammonium salt of the interpolymer produced was prepared and its viscosity was determined to be 44,500 centipoises using a Brookfield viscosimeter (about 25° C., No. 4 spindle, 6 r.p.m.).

Example 5

The polymerization of Example 4 was repeated with 4% by weight of 1,10-diallyloxydecane being used for cross-linking purposes. The polymer product was recovered and converted to its ammonium salt form. The viscosity of a 1% aqueous dispersion of this polymeric salt was found to be >100,000 centipoises using a Brookfield viscosimeter with a No. 4 spindle at 6 r.p.m. at about 25° C.

Example 6

Viscosity determinations were made on 1% aqueous dispersions of the salt form of the interpolymers of Examples 1 through 5 after samples of the aqueous gels had been stored over various periods of time at room temperature. A Brookfield viscosimeter was employed using a No. 4 spindle at 6 r.p.m. at 25° C. Results are tabulated below with the original values included for completeness. Included for comparative purposes are similar data obtained on an aqueous dispersion of the ammonium salt form of an interpolymer of ethylene, maleic anhydride and triallyl cyanurate, the latter compound being a well known cross-linking agent. This is identified as Example 6 in the table. All values given are centipoises.

| Inter-Polymer | Elapsed Time (Hr.) | | | | | | | |
|---|---|---|---|---|---|---|---|---|
| | None | 24 | 48 | 72 | 96 | 120 | 144 | 168 |
| Ex. 1 | 4,500 | | | | | | | |
| Ex. 2 | 20,000 | | | | | | | |
| Ex. 3 | 78,000 | 66,200 | 51,500 | 62,500 | 16,000 | 3,300 | 3,200 | 3,300 |
| Ex. 4 | 44,500 | 41,500 | 39,100 | 38,400 | 63,700 | 15,000 | 14,500 | 15,100 |
| Ex. 5 | >100,000 | >100,000 | >100,000 | | | | 36,500 | |
| Ex. 6 | 38,000 | 28,600 | 19,600 | 13,500 | 9,200 | | | |

Example 7

The extent of cross-linking of the polymers of Examples 1 through 5 was determined by means of extraction with acetone. Linear copolymers of $C_2$–$C_4$ olefins and maleic anhydride are soluble in acetone whereas the cross-linked interpolymers generally are not. A known weight of the dried interpolymer (~1 g.) was weighed into a Soxhlet thimble and extracted for 24 hours with boiling C.P. acetone. The thimble and residue were then dried in a vacuum oven at 110° C.–115° C. and 1 mm. for 16 hr. and reweighed. The percent extractable material was then calculated from the weight loss. Results are tabulated below and are to be compared with a value of 83.9% obtained for a linear copolymer of ethylene and maleic anhydride prepared under the same conditions as the interpolymers of the examples.

| Sample | Percent acetone-soluble |
|---|---|
| Example 1 | 40.7 |
| Example 2 | 31.8 |
| Example 3 | 31.0 |
| Example 4 | 35.5 |
| Example 5 | 25.2 |

What is claimed is:

1. A resinous cross-linked interpolymer of substantially equimolar portions of maleic anhydride and a monoolefin having from 2 to 4 carbon atoms and from about 0.1% to about 5.0% by weight based on the reacting monomers of a diallyloxy hydrocarbon of the formula $$CH_2=CH-CH_2-O-R-O-CH_2-CH=CH_2$$

wherein R is a straight-chain aliphatic hydrocarbon radical of from 4 to 12 carbon atoms selected from the group consisting of alkylene radicals and unsaturated radicals of the formula $C_nH_{2n-2}$.

2. A resinous cross-linked interpolymer of substantially equimolar portions of maleic anhydride and ethylene and from about 0.1% to about 5.0% by weight based on the reacting monomers of a diallyloxy hydrocarbon of the formula $$CH_2=CH-CH_2-O-R-O-CH_2-CH=CH_2$$

wherein R is a straight-chain aliphatic hydrocarbon radical of from 4 to 12 carbon atoms selected from the group consisting of alkylene radicals and unsaturated radicals of the formula $C_nH_{2n-2}$.

3. A resinous cross-linked interpolymer of equimolar portions of maleic anhydride and ethylene and from about 0.1% to about 5.0% by weight based on the reacting monomers of 1,4-diallyloxybutene-2.

4. A resinous cross-linked interpolymer of equimolar portions of maleic anhydride and ethylene and from about 0.1% to about 5.0% by weight based on the reacting monomers of 1,10-diallyloxydecane.

5. A salt chosen from the group consisting of the alkali metal and ammonium salts of a resinous cross-linked interpolymer of substantially equimolar portions of maleic anhydride and a monoolefin having from 2 to 4 carbon atoms and from about 0.1% to about 5.0% by weight based on the reacting monomers of a diallyloxy hydrocarbon of the formula $$CH_2=CH-CH_2-O-R-O-CH_2-CH=CH_2$$

wherein R is a straight-chain aliphatic hydrocarbon radical of from 4 to 12 carbon atoms selected from the group consisting of alkylene radicals and unsaturated radicals of the formula $C_nH_{2n-2}$.

6. A salt chosen from the group consisting of the alkali metal and ammonium salts of a resinous cross-linked interpolymer of equimolar portions of maleic anhydride and ethylene and from about 0.1% to about 5.0% by weight based on the reacting monomers of a diallyloxy hydrocarbon of the formula $$CH_2=CH-CH_2-O-R-O-CH_2-CH=CH_2$$

wherein R is a straight-chain aliphatic hydrocarbon radical of from 4 to 12 carbon atoms selected from the group consisting of alkylene radicals and unsaturated radicals of the formula $C_nH_{2n-2}$.

7. A salt chosen from the group consisting of the alkali metal and ammonium salts of a resinous cross-linked interpolymer of equimolar portions of maleic anhydride and ethylene and from about 0.1% to about 5.0% by weight based on the reacting monomers of 1,4-diallyloxybutene-2.

8. A salt chosen from the group consisting of the alkali metal and ammonium salts of a resinous cross-linked interpolymer of equimolar portions of maleic anhydride and ethylene and from about 0.1% to about 5.0% by weight based on the reacting monomers of 1,10-diallyloxydecane.

References Cited in the file of this patent

UNITED STATES PATENTS

| 2,621,169 | Robinette et al. | Dec. 9, 1952 |
| 2,798,053 | Brown | July 2, 1957 |
| 2,923,692 | Ackerman et al. | Feb. 2, 1960 |